(12) United States Patent
Sheybani et al.

(10) Patent No.: US 12,547,683 B2
(45) Date of Patent: Feb. 10, 2026

(54) ZERO KNOWLEDGE PROOF OF DEEP NEURAL NETWORK OWNERSHIP

(71) Applicant: The Regents of the University of California, Oakland, CA (US)

(72) Inventors: Nojan Sheybani, San Diego, CA (US); Farinaz Koushanfar, San Diego, CA (US); Ritvik Kapila, San Diego, CA (US); Zahra Ghodsi, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 107 days.

(21) Appl. No.: 18/651,467

(22) Filed: Apr. 30, 2024

(65) Prior Publication Data
US 2024/0370535 A1  Nov. 7, 2024

Related U.S. Application Data

(60) Provisional application No. 63/499,650, filed on May 2, 2023.

(51) Int. Cl.
  *G06F 21/16* (2013.01)
  *G06N 3/08* (2023.01)
  *H04L 9/32* (2006.01)
(52) U.S. Cl.
  CPC ........... *G06F 21/16* (2013.01); *G06N 3/08* (2013.01); *H04L 9/3218* (2013.01)

(58) Field of Classification Search
  None
  See application file for complete search history.

(56) References Cited

U.S. PATENT DOCUMENTS

2023/0325527 A1\* 10/2023 Yarabolu ............. G06F 18/2185
                                                                  726/26

FOREIGN PATENT DOCUMENTS

WO    WO-2023183311 A1 \*  9/2023  ........... G06Q 50/167

\* cited by examiner

*Primary Examiner* — William J. Goodchild
(74) *Attorney, Agent, or Firm* — FisherBroyles, LLP

(57) ABSTRACT

In some implementations, a secure setup is performed by a trusted third party to generate, based on an obfuscated watermark extractor, a prover key and a verifier key to prove ownership of a first machine learning model by a model owner without divulging a trigger key or a watermark corresponding to the first machine learning model. Next, the model owner of the first machine learning model generates, based on the prover key, a proof of ownership of a second machine learning model by at least determining that the obfuscated watermark extractor extracts the watermark from the second machine learning model in response to the second machine learning model being provided as a public input to the obfuscated watermark extractor. Then, the proof of ownership is verified, based on the verifier key, to acknowledge that the second machine learning model matches the first machine learning model.

20 Claims, 13 Drawing Sheets

Algorithm 1 ZKROWNN Watermark Extraction

Public Values: Model $\mathcal{M}$, target BER $\theta$
Private Input: trigger key $X^{key}$, $B$-bit watermark $wm$, projection matrix $A^{M \times N}$ where $M = $ size of feature space and $N = $ size of $wm$, embedded layer $l_{wm}$.

Circuit:
$check = 1$
$zkFeedForward(\mathcal{M})$ on input $X^{key}$ until layer $l_{wm}$
Extract activation maps $a$ at layer $l_{wm}$
$\mu^{1 \times M} = zkAverage(a)$
$G^{1 \times N} = zkSigmoid(\mu^{1 \times M} \times A^{M \times N})$
$\widehat{wm} = zkHard\_Thresholding(G^{1 \times N}, 0.5)$
$valid\_BER = zkBER(wm, \widehat{wm}, \theta)$
return $check \wedge valid\_BER$

$$f(x) = \begin{cases} 1 & \text{if } x \geq \beta \\ 0 & \text{if } x < \beta \end{cases}$$

TABLE 1

Zero-knowledge performance benchmarks on all individual zkSNARK circuits and end-to-end examples. All individual, meaning not end-to-end, circuits (e.g. MatMul) are run with private inputs and public outputs. For sake of consistency, 2D operations are run with 128 × 128 inputs and 1D operations are run with length 128 inputs. Conv3D is run with 32 × 32 × 3 inputs with 32 output channels, 3 × 3 filter size, and stride 2.

| Benchmark | # Constraints | Setup Runtime (s) | PK size (MB) | P Runtime (s) | Proof Size (B) | VK size (KB) | V Runtime (ms) |
|---|---|---|---|---|---|---|---|
| MatMul | 1,097,344 | 57.3976 | 215.6618 | 18.6805 | 127.375 | 0.199 | 8.6 |
| Conv3D | 235,899 | 13.3621 | 46.3793 | 4.3981 | 127.375 | 0.199 | 8.6 |
| ReLU | 8,932 | 0.6384 | 1.7193 | 0.1907 | 127.375 | 5.303 | 8.7 |
| Average2D | 545,793 | 29.0246 | 107.3271 | 5.5570 | 127.375 | 5.303 | 8.6 |
| Sigmoid | 454,656 | 24.4980 | 90.5934 | 9.3680 | 127.375 | 44.0034 | 8.5 |
| Hard Thresholding | 8,704 | 0.624 | 1.6978 | 0.1897 | 127.375 | 5.303 | 8.7 |
| BER | 8,832 | 0.6433 | 1.7526713 | 0.1826 | 127.375 | 0.2809 | 8.6 |
| MNIST-MLP | 2,093,648 | 68.4456 | 283.3809 | 45.1208 | 127.375 | 16,006.343 | 29.4 |
| CIFAR10-CNN | 598,624 | 22.35 | 117.1699 | 11.22 | 127.375 | 34.681 | 1 |

FIG. 6

TABLE II

DETAILS OF DNN BENCHMARKS. FC(A) REPRESENTS A FULLY CONNECTED LAYER WITH A NEURONS, C(A,B,C) REPRESENTS A CONVOULTION LAYER WITH A OUTPUT CHANNELS, FILTER SIZE B, AND STRIDE C. MP(A,B) REPRESENTS A MAX POOLING LAYER WITH FILTER SIZE A AND STRIDE B.

| Dataset | Architecture |
| --- | --- |
| MNIST | 784 - FC(512) - FC(512) - FC(10) |
| CIFAR10 | 3×32×32 - C(32, 3, 2) - C(32, 3, 2) - C(32, 3, 1) - MP(2, 1) - C(64, 3, 1) - C(64, 3, 1) - MP(2, 1) - FC(512) - FC(10) |

FIG. 7

ZERO KNOWLEDGE PROOF OF DEEP NEURAL NETWORK OWNERSHIP

CROSS-REFERENCE TO RELATED APPLICATIONS

The present application claims priority to U.S. Provisional Patent Appl. No. 63/499,650 to Sheybani et al., filed May 2, 2023, and entitled "METHOD FOR ZERO KNOWLEDGE PROOF OF DEEP NEURAL NETWORK OWNERSHIP," and incorporates its disclosure herein by reference in its entirety.

TECHNICAL FIELD

The present disclosure generally relates to a watermark extraction and verification framework for deep neural networks.

BACKGROUND

Deep Neural Networks (DNN) have emerged as the de facto solution for major learning applications such as image and face recognition and natural language processing. Training state-of-the-art DNNs requires access to large amounts of data, as well as massive computational resources. For example, recent language models are trained on terabytes of data, have billions of parameters, and require hundreds of graphics processing unit (GPUs) and algorithmic expertise for training. Training contemporary artificial intelligence (AI) models may require investment in procuring learning data and computing resources, making the models intellectual property of the owners.

Given the amount of required data and computing resources spent on training a model, vendors who give access to their trained models remotely or release them publicly have an interest in protecting the intellectual property rights of their models against copyright infringements. However, various challenges in protecting deep learning models have been encountered.

SUMMARY

In some implementations, a secure setup is performed by a trusted third party to generate, based on an obfuscated watermark extractor, a prover key and a verifier key to prove ownership of a first machine learning model by a model owner without divulging a trigger key or a watermark corresponding to the first machine learning model. Next, the model owner of the first machine learning model generates, based on the prover key, a proof of ownership of a second machine learning model by at least determining that the obfuscated watermark extractor extracts the watermark from the second machine learning model in response to the second machine learning model being provided as a public input to the obfuscated watermark extractor. Then, the proof of ownership is verified, based on the verifier key, to acknowledge that the second machine learning model matches the first machine learning model. Next, one or more actions are performed in response to acknowledging that the second machine learning model matches the first machine learning model. These one or more actions may include redirecting an attempt to access the second machine learning model to the first machine learning model.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 illustrates an example of a ZKROWNN watermark extraction algorithm, in accordance with some example implementations of the current subject matter;

FIG. 5 illustrates an equation of a Chebyshev polynomial approximation of the sigmoid function and a piecewise function, in accordance with some example implementations of the current subject matter;

FIG. 6 illustrates a table which highlights the end-to-end performance of ZKROWNN on benchmark architectures, in accordance with some example implementations of the current subject matter;

FIG. 7 illustrates a table describing the benchmark architectures used for evaluations of ZKROWNN, in accordance with some example implementations of the current subject matter;

DETAILED DESCRIPTION

Figure 1:
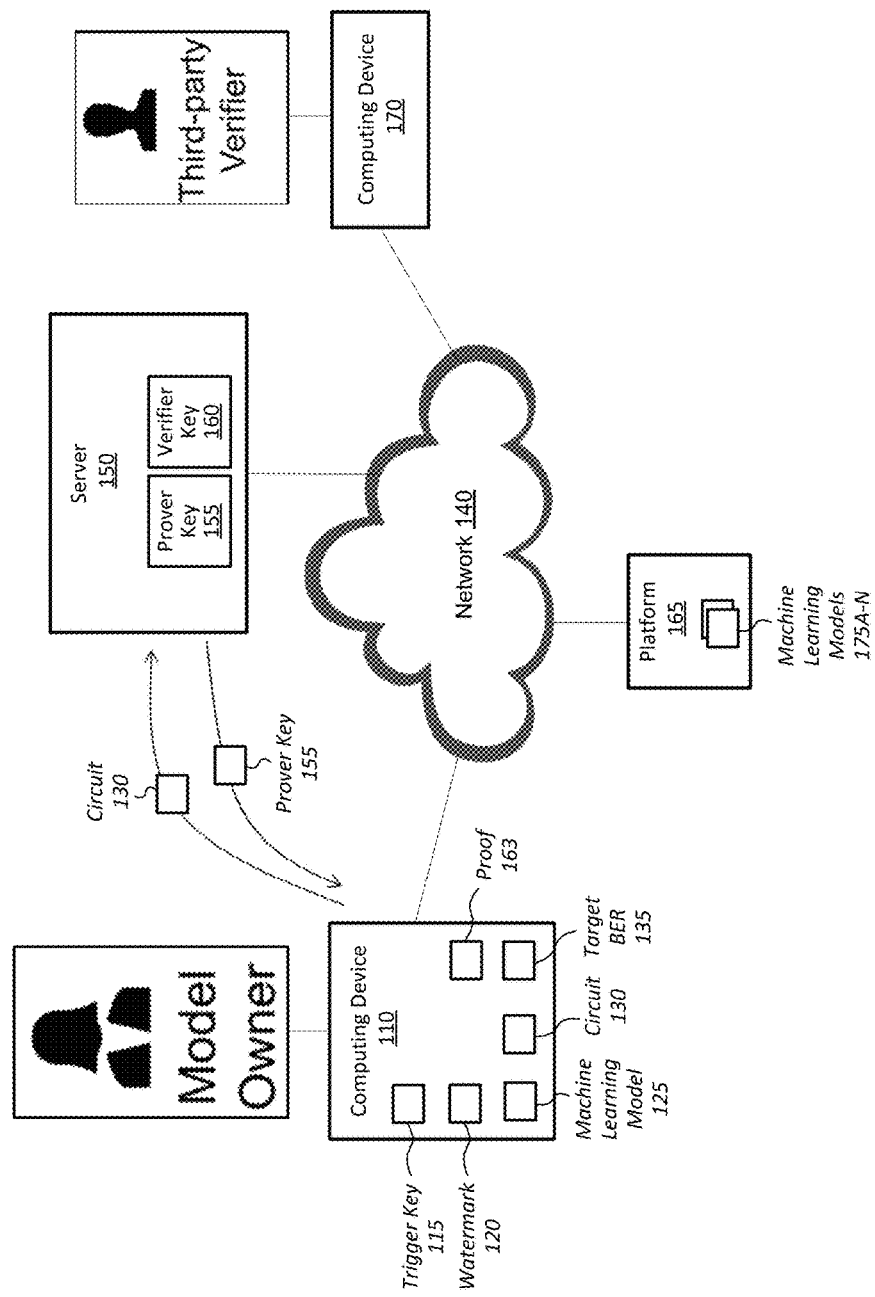
FIG. 1 illustrates an example of a computing system, in accordance with some example implementations of the current subject matter.

Popular model watermarking solutions rely on key input triggers for detection, but the keys should be kept private to prevent discovery, forging, and removal of the hidden signatures. Disclosed herein are systems, methods, and articles of manufacture (referred to herein as ZKROWNN) for a first automated end-to-end framework utilizing Zero-Knowledge Proofs (ZKP) that enable an entity to validate their ownership of a model, while preserving the privacy of the watermarks. ZKROWNN permits a third party client to verify model ownership in less than a second, requiring as little as a few kilobytes (KBs) of communication.

Given the amount of data and computing resources spent on training a model, vendors who give access to their trained models remotely or release them publicly have an interest in protecting the intellectual property rights of their models against copyright infringements. Towards this goal, watermarking of deep learning models may be employed. Watermarks are designed in order to target the decision boundary of the model to resist against various removal attempts such as fine-turning and pruning, while retaining a high accuracy. Extracting the watermark signature involves providing a special key input that triggers the watermark which can be detected at the output, e.g. by a threshold function. However, once the key pertaining to the watermark is revealed, the embedded signature can be easily discovered and removed. This property creates an impediment for litigating an ownership dispute which would require providing proofs of ownership during the discovery process to potentially multiple parties.

Disclosed herein there is provided use of Zero-Knowledge Proofs (ZKP) to facilitate legitimate proof of deep neural network (DNN) ownership without revealing any other information. ZKPs are a particular set of protocols in cryptography involving a prover (P) and a verifier (V). The prover seeks to prove a mathematical assertion on a private input to the verifier, without disclosing any other information about the input.

The subject matter presented herein demonstrates how ZKPs can be used by expert witnesses and other parties to verify ownership claims without revealing details on the watermarking procedure that could jeopardize the intellectual property rights of the model owner. The use of ZKPs in legal settings should satisfy two main requirements. First, executing the protocol should be simple, and it is beneficial that the interaction be limited to P sending a single message to V for verification. Second, the proof has to be publicly verifiable (i.e., P can perform the proof generation once that can be verified by any party, without having to convince every entity in a separate process).

Non-interactive Zero-Knowledge Proof systems (NIZK) support these requirements. NIZK include a one-time setup, and the process of verifying the proof consists of a single message sent from the prover to verifier. This is in contrast to interactive proof protocols where verification is performed over multiple rounds, and has to be repeated with every new verifier. The disclosed subject matter builds on zero-knowledge succinct non-interactive arguments of knowledge (zkSNARKs) to implement watermark extraction including feed-forward computations in DNNs and sigmoid thresholding for trigger detection. zkSNARK setup and proof generation steps are circuit dependent. If the circuit changes often, this technique could be quite computationally intensive. Fortunately, the disclosed subject matter can handle a constant circuit representing the pertinent DNN. Moreover, there is disclosed an example of a concrete implementation that demonstrates the applicability of the disclosed framework. Furthermore, it is shown that the disclosed framework is able to prove ownership with as little as 11 seconds and 1 millisecond (ms) of computation time on the prover and verifier side respectively, and as little as 35 KB of communication for image recognition benchmarks. The disclosed setting only requires setup and proof generation once as the circuit does not change, resulting in amortized prover and setup computation time compared to the overall usage lifetime.

ZKROWNN is an end-to-end watermark extraction and verification framework for deep neural networks based on zero-knowledge proofs. ZKROWNN enables a model owner to prove their right of ownership without revealing details of the watermarking technique. In some embodiments, ZKROWNN incorporates non-interactive proofs for simplified proof generation and verification. In some embodiments, ZKROWNN's proofs are publicly verifiable, i.e., the proof is generated once and can be verified by third parties without further interaction. There is also disclosed an example of a concrete implementation of ZKROWNN with extensive evaluation on various benchmarks. ZKROWNN requires small communication (less than 16 megabytes (MB) during setup and only 128B to transfer the proof for a given example), and enables sub-second proof verification.

Watermarking techniques have been extended to DNNs to protect the intellectual property of model owners. Watermarking can be considered analogous to introducing a backdoor in a neural network, especially in the case of black box dynamic watermarking. A backdoor is embedded in the model by handcrafting key input triggers which generate the desired watermark. The model continues to perform at the same accuracy with minimal overhead, except when these selected key inputs are used to verify the watermark.

Watermarks can be embedded in weights, activations, or near the decision boundary of neural networks. For image processing networks, spatially invisible watermarking mechanisms may be employed. A unified and invisible signature is learned and embedded into all the outputs, which can be extracted afterwards to verify ownership. Additional methods include introduction of statistical bias in the weights while training a neural network. An embedding regularizer, which uses binary cross entropy loss, may be used in the standard cost function of one of the convolution layers. The watermark can be extracted by projecting w using a secret key X, where the $j^{th}$ bit of the watermark is extracted as $b_j = s(\Sigma_i X_{ji} w_i)$. Here, $s(x)$ is a step function, $w_i$ are the weights of the network and X is the secret key required to embed and detect the watermarks. This methodology has advantages over the usual procedure of embedding the signature in the weights of a trained network as it does not degrade the network's performance after training and embeds the signature during training itself. However, embedding the signatures in the weights of the DNN, even while training, poses significant challenges related to watermark robustness, and makes it prone to watermark overwriting and network morphism.

In an example, the watermarking method presented in DeepSigns (which embeds the watermark into the probability density function (PDF) of activation maps across various layers of the network) may be employed. DeepSigns takes the trained model along with an owner-defined watermark signature, and produces a watermarked network. DeepSigns watermark embedding is a two-step process, beginning with securely generating owner-specific watermark (WM) keys. In the next step, the owner's DNN is fine-tuned and the generated WM signature is embedded into the pdf distribution of the activation maps of selected layers. The encoded watermark signatures are Independently and Identically Distributed (iid) arbitrary binary strings. For the intermediate hidden layers, the data distribution is assumed to be a Gaussian Mixture Model (GMM). One or more random indices are selected from 1 to S, where each index corresponds to a Gaussian in the mixture model. S is the number of classes in the final application. The WM signature is then embedded into the mean of these selected Gaussian distributions. The WM keys contain three parameters, the chosen Gaussian classes s, the input triggers, which are basically a subset (1%) of the input training data ($X^{key}$), and the projection matrix A. The projection matrix is used to project the mean values of the selected Gaussian distributions into binary space. To minimize the distance between these mean values, that is the centers of the Gaussian distributions and the owner's WM signature, an additional loss term is added to the cost function while fine tuning.

The watermark extraction phase consists of three steps. It begins with querying the underlying DNN with the owner-specific watermark keys ($X^{key}$) generated during embedding. In the next step, the Gaussian Centers are approximated by taking a statistical mean of the obtained activation maps. These Gaussian centers and the projection matrix A, obtained from the owner's WM keys, are used to estimate the relevant WM signature. Finally, the bit error rate (BER) between the obtained WM signature and the owner's actual signature is computed. If the BER is zero for any layer, DeepSigns ascertains that the deployed DNN is the IP of the model owner in question. This WM methodology is robust to watermark overwriting, model fine-tuning and model-pruning.

ZKPs are a cryptographic primitive that allows a prover P to convince a verifier V that an evaluation of computation C on P's private input w, also called the witness, is correct without revealing anything about w. In a standard ZKP scheme, P convinces V that w is a valid input such that y=C(x, w), in which x and y are public inputs and outputs, respectively. When the communication of this proof is done in a single message, the ZK scheme is referred to as non-interactive. ZKPs can also be generated interactively, in which the proof is computed through several rounds of communication between P and V, but this requires V to be online for the duration of proof generation, which may be undesirable when there are many verifiers. Interactive ZKP schemes are limited, as they only support the designated verifier model, meaning that a new proof must be generated for each verifier for one circuit C. In contemporary ZK constructions, C is expressed as an efficient generalization of an arithmetic circuit, such as Rank 1 Constraint Systems (R1CS) or Quadratic Arithmetic Programs (QAPs), which have been popularized due to their ease of use.

Zero-knowledge succinct non-interactive arguments of knowledge (zkSNARKs) have been utilized for a myriad of tasks, including the real-world case of Zcash's privacy preserving cryptocurrency. zkSNARKs have emerged as a popular ZKP method, acting as the technical foundation for many ZK works, as this construction provides fast and computationally inexpensive proof verification. zkSNARKs also benefit from being publicly verifiable, meaning that any verifier with the proper verification key can verify a zkSNARK. The main drawback of zkSNARKs are the reliance on a trusted setup for every new circuit C and the intensive computation necessary for proof generation. If C does not change often, or at all, these computational drawbacks can be amortized.

In some embodiments, a Groth16 zkSNARK protocol, which is based on QAP representations of computation, may be used. The high-level approach for proof generation with Groth16 (and other NIZKs in general) can be represented with the three following algorithms: (VK, PK)←Setup (C): A trusted third party or V runs a setup procedure to generate a prover key PK and verifier key VK. These keys are used for proof generation and verification, respectively. This setup must be repeated each time C changes. π←Prove (PK, C, x, y, w): P generates proof to convince V that w is a valid witness. 1/0←Verify (VK, C, x, y, π): V accepts or rejects proof π. Due to the soundness property of zkSNARKs, V cannot be convinced that w is a valid witness by a cheating P.

The Groth16 protocol allows for small proofs and fast verification, independent of the circuit size, at the cost of higher prover and setup complexity. Due to the static nature of C in ZKROWNN, proof generation and setup only happen once, so runtimes are amortized and therefore negligible.

In an example, it is assumed that a model owner holds a watermarked model M with private trigger key K and watermark parameters W. The model owner claims that a second model M' is built based on watermarked model M. The model owner takes the role of a prover P, and generates a proof π attesting that M' produces the watermark W when triggered with K. In a given threat model, prover P is semi-honest, meaning that P will not deviate from the protocol. The ownership proof π can be verified by any third party V, requiring only a verification key. The proof generation and verification steps in ZKROWNN are illustrated in FIG. 4. ZKROWNN utilizes zkSNARKs to enable proof of ownership without revealing the trigger key K and watermark W. The watermark embedding and extraction technique in DeepSigns may be extended to implement ZKROWNN. In an example, the watermark is embedded in a specific layer, which is only known to the original model owner. This watermark is only extractable when the model takes in a specific trigger key as an input. In an example, the watermarks are embedded in and extracted from the probability density function (pdf) of the activation maps in the model. Based on the preceding description, ZKROWNN's zero-knowledge watermark extraction is outlined in Algorithm 400 of FIG. 4.

Referring now to FIG. 1, an example of a computing system 100 is depicted, in accordance with some example embodiments. As shown in FIG. 1, the computing system 100 may include at least a server 150, a platform 165, and a plurality of computing devices 110 and 170 connected to network 140. Generally speaking, the server 150 and/or platform 165 may provide resources that can be shared among a plurality of tenants (i.e., clients). In various embodiments, the server 150 and/or platform 165 may be configured to provide a variety of services including, for example, software-as-a-service (SaaS), platform-as-a-service (PaaS), infrastructure as a service (IaaS), and/or the like, and these services can be accessed by one or more tenants of the server 150 and/or platform 165.

In an example, platform 165 may offer various machine learning models 175A-N and/or other software applications for use to a variety of customers. The access to machine learning models 175A-N may be subscription based or on an usage basis for each use of a given machine learning model 175A-N and/or a particular software application. Computing device 110 may be associated with a model owner of machine learning model 125, and the model owner may suspect that one of machine learning models 175A-N is actually a copy of machine learning model 125. Machine learning model 125 may include one or more watermarks 120 which can be extracted from the model when triggered by a particular trigger key 115. However, the model owner may wish to prove ownership of a given machine learning model 175A without divulging the trigger key 115 and watermark(s) 120 of machine learning model 125. More details on how the model owner can prove ownership of machine learning model 175A while keeping their trigger key(s) 115 and watermark(s) 120 private will be provided after a brief discussion of the architecture of system 100.

In the example of FIG. 1, the system 100 includes computing devices 110 and 170 which are representative of any number of clients (i.e., tenants). For example, multi-tenancy enables multiple end-user devices (e.g., a computer including an application) to access a given server having shared resources via the Internet and/or other type of network or communication link(s). It is noted that computing devices 110 and 170 may also be referred to as computing systems, computing apparatuses, and so on.

The server 150 and/or platform 165 may include resources, such as at least one computer (e.g., a server), data storage, and a network (including network equipment) that couples the computer(s) and storage. The server 150 and/or platform 165 may also include other resources, such as operating systems, hypervisors, and/or other resources, to virtualize physical resources (e.g., via virtual machines) and provide deployment (e.g., via containers) of applications (which provide services, for example, on the server, and other resources). In the case of a "public" server or cloud platform, the services may be provided on-demand to a client, or tenant, via the Internet. For example, the resources at the public cloud platform may be operated and/or owned by a cloud service provider (e.g., Amazon Web Services, Azure, etc.), such that the physical resources at the cloud service provider can be shared by a plurality of tenants. Alternatively, or additionally, the server 150 and/or platform 165 may be part of a "private" cloud platform, in which case the server 150 and/or platform 165 may be one of an entity's own private servers (e.g., dedicated corporate servers operated and/or owned by the entity). Alternatively, or additionally, the server 150 and/or platform 165 may be considered part of a "hybrid" cloud platform, which includes a combination of on-premises resources as well as resources hosted by a public or private cloud platform. For example, a hybrid cloud service may include web servers running in a public cloud while application servers and/or databases are hosted on premise (e.g., at an area controlled or operated by the entity, such as a corporate entity).

In an example, server 150 may perform a secure setup operation to enable the model owner of machine learning model 125 to prove ownership of other machine learning models that are copies of machine learning model 125. In other examples, any of various other entities may perform the secure setup operation associated with machine learning model 125. In the example when server 150 performs the secure setup operation, server 150 generates prover key 155 and verifier key 160 based on circuit 130, with circuit 130 representing a functional description of a watermark extraction mechanism associated with machine learning model 125. This secure setup operation allows the model owner to keep trigger key 115 and watermark 120 private. It is noted that watermark 120 is representative of any number of watermarks. For example, machine learning model 125 may include two or more watermarks 120 in some embodiments.

As used herein, the term "prover key" may be defined as a value that enables a prover to generate a proof that a result of a computation is valid without divulging private inputs to the computation. Also, as used herein, the term "verifier key" may be defined as a value that enables a verifier to verify a proof of a valid computation result while remaining unaware of private inputs to the computation.

In an example, circuit 130 may be generated based on machine learning model 125 to enable determining whether other machine learning models, such as any of machine learning models 175A-N, are built based on machine learning model 125 but without divulging trigger key 115 and watermark 120. Circuit 130 may include logic for implementing a feed-forward operation to feed trigger key 115 through one or more layers of a machine learning model provided as an input to circuit 130 until an output can be extracted from a given layer of the machine learning model. The output extracted from the given layer of the machine learning model may pass through one or more averaging maps, a projection matrix, sigmoid thresholding operations, and/or other operations to generate an intermediate watermark output. The intermediate watermark output may be compared, internally to circuit 130, with watermark 120 to determine a bit error rate (BER) between the intermediate watermark output and watermark 120. In an example, if the BER is less than or equal to target BER 135, then the machine learning model provided as an input to circuit 130 is considered to be a copy of machine learning model 125. Otherwise, if the BER is greater than the target BER 135, then the machine learning model provided as an input to circuit 130 is not a match of machine learning model 125.

As used herein, the term "circuit" may be defined as a functional description of a zero-knowledge watermark extraction mechanism associated with a particular machine learning model. In the example of FIG. 1, circuit 130 is associated with machine learning model 125, such that circuit 130 is a functional description of how to perform a zero-knowledge watermark extraction from machine learning model 125. In other words, circuit 130 provides a representation of the computations required to extract a watermark from a machine learning model provided as an input to circuit 130, after which the extracted watermark is compared to watermark 120 from machine learning model 125 without divulging the trigger key 115, the watermark 120, or the layer from which the watermark is extracted. The term "obfuscated watermark extractor" may be defined as a proof mechanism between a prover and a verifier that allows the prover to prove to the verifier that an extracted watermark matches a reference watermark without revealing anything about the trigger key, extracted watermark, and reference watermark. It is noted that the terms "circuit" and "obfuscated watermark extractor" may be used interchangeably herein.

After prover key 155 and verifier key 160 are generated, the model owner may attempt to prove ownership of a machine learning model 175A which is suspected of being a copy of machine learning model 125. To prove that the machine learning model 175A is a copy of machine learning model 125, the model owner may generate, based on prover key 155, proof 163 by providing machine learning model 175A as a public input to circuit 130. As used herein, the term "proof" is defined as an executable algorithmic arrangement, such as a program, which allows a verifier in possession of a verifier key to verify that an output of a computation is valid while remaining unaware of private inputs to the computation.

After proof 163 is generated, the model owner may then provide proof 163 and circuit 130 to platform 165, the third-party verifier associated with computing device 170, and/or other entities. Any entity may verify that the machine learning model 175A is a copy of machine learning model 125 using the verifier key 160, proof 163, and circuit 130. If it is determined that the machine learning model 175A is a copy of machine learning model 125, then one or more actions may be performed as a result of this determination. For example, the owner of platform 165 may be notified that machine learning model 175A is a copy of machine learning model 125 so that machine learning model 175A may be removed from platform 165. Alternatively, platform 165 may be required to forward user payments to the model owner when users access machine learning model 175A on platform 165. Alternatively, users attempting to employ machine learning model 175 on platform 165 may be prevented from using machine learning model 175 on platform 165 and instead may be redirected to a separate platform associated with the model owner of machine learning model 125.

In an example, prior to enabling the use of machine learning model 175A on platform 165, the provider (e.g., owner or operator of the platform 165) may run a check to see if machine learning model 175A is a copy of and/or was built based on any other machine learning models. Alternatively, the provider of platform 165 may run a check on machine learning model 175A based on receiving a complaint or inquiry from the model owner of machine learning model 125. As part of this check, the provider may validate proof 163 using verifier key 160 and circuit 130. If the provider of platform 165 determines that proof 163 is valid, which means that machine learning model 175A matches machine learning model 125, then the provider may remove machine learning model 175A from platform 165 to prevent their customers from using machine learning model 175A. Alternatively, in a further example, in response to determining that machine learning model 175A is a match to machine learning model 125, the provider of platform 165 may pay a licensing fee to the model owner of machine learning model 125. In a still further example, the provider of platform 165 may route customers to another platform which hosts machine learning model 125 and through which the model owner of machine learning model 125 receives payment. Other types of actions that are taken as a result of determining that that the machine learning model 175A is a copy of machine learning model 125 are possible and are contemplated.

As shown in FIG. 1, the server 150, the platform 165, and the computing devices 110 and 170 may be communicatively coupled via a network 140. Network 140 may be any wired and/or wireless network including, for example, a public land mobile network (PLMN), a wide area network (WAN), a local area network (LAN), a virtual local area network (VLAN), the Internet, and/or the like. Each computing device 110 and 170 may be a processor-based device including, for example, a smartphone, a tablet computer, a wearable apparatus, a virtual assistant, an Internet-of-Things (IoT) appliance, and/or the like.

Figure 2:
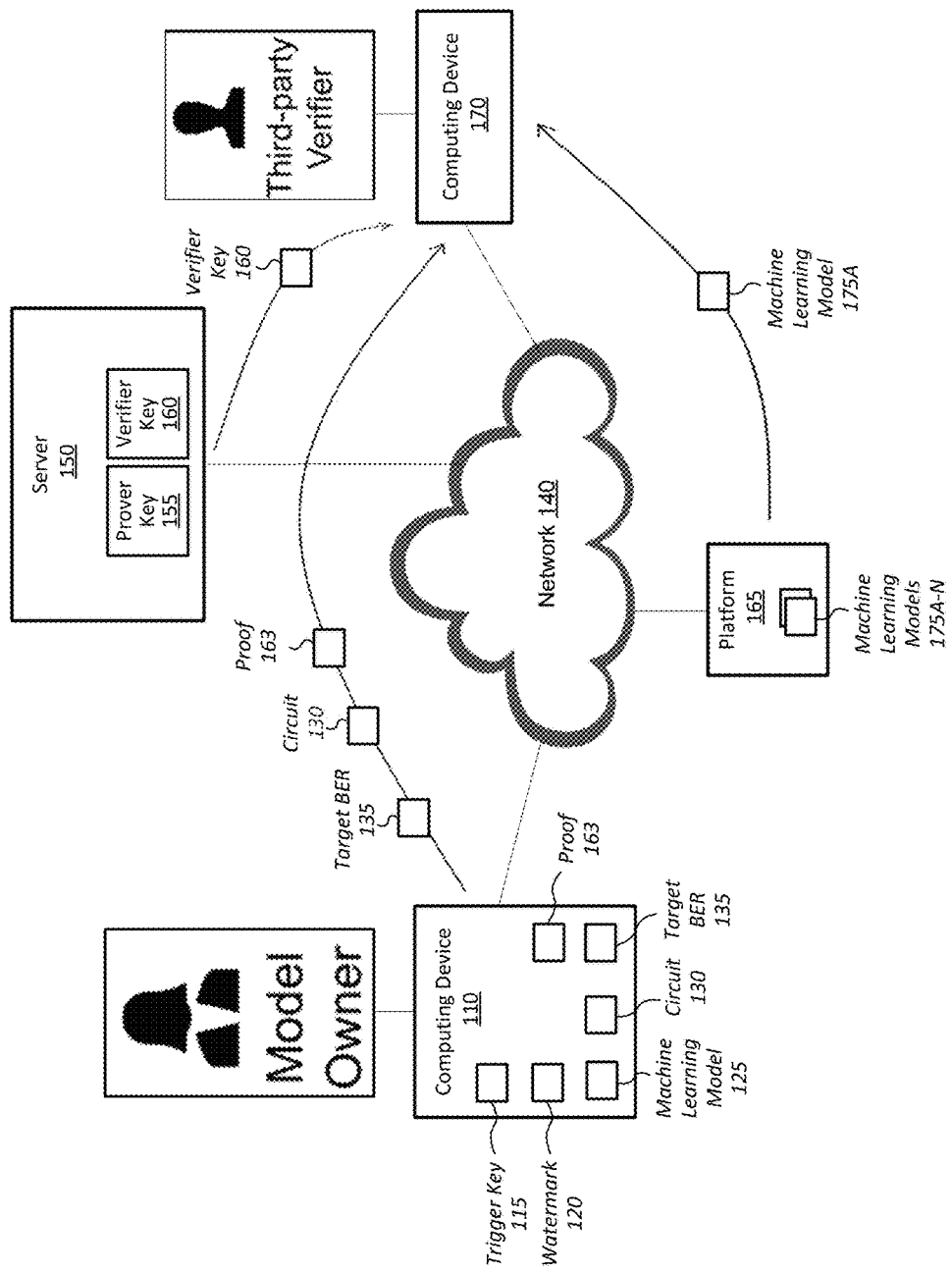
FIG. 2 illustrates an example of a computing system, in accordance with some example implementations of the current subject matter.

Turning now to FIG. 2, an example of a computing system 200 is depicted, in accordance with some example embodiments. Computing system 200 is intended to represent computing system 100 (of FIG. 1), albeit at a later point in time. As such, computing system 200 includes the same components of computing system 100, namely computing devices 110 and 170, network 140, server 150, and platform 165. At the point in time depicted in FIG. 2, the model owner of machine learning model 125 is attempting to prove ownership of machine learning model 175A to the third-party verifier associated with computing device 170. To prove ownership, the model owner may send circuit 130, target BER 135, and proof 163 to computing device 170. Also, computing device 170 may receive machine learning model 175A from platform 165 and verifier key 160 from server 150. Computing device 170 may verify that proof 163 is valid using verifier key 160 and by providing machine learning model 175A as an input to circuit 130.

It is noted that in another embodiment, platform 165 may verify that the model owner of machine learning model 125 is the owner of machine learning model 175A. This verification may be achieved in a similar fashion to the example shown in FIG. 2 for the third-party verifier associated with computing device 170. When platform 165 performs the verification, platform 165 will receive the verifier key 160 from server 150, and platform 165 will receive circuit 130, target BER 135, and proof 163 from computing device 110. Platform 165 may then verify that proof 163 is valid using verifier key 160 and by providing machine learning model 175A as an input to circuit 130.

It is noted that when circuit 130 receives machine learning model 175A as an input, the application of trigger key 115 and the extraction of the embedded watermark from the appropriate layer of machine learning model 175A occur internally to circuit 130 and are not discernible to the verifier. This ensures that the model owner of machine learning model 125 can keep trigger key 115 and watermark 120 private while still being able to prove ownership of machine learning model 175A.

Figure 3:
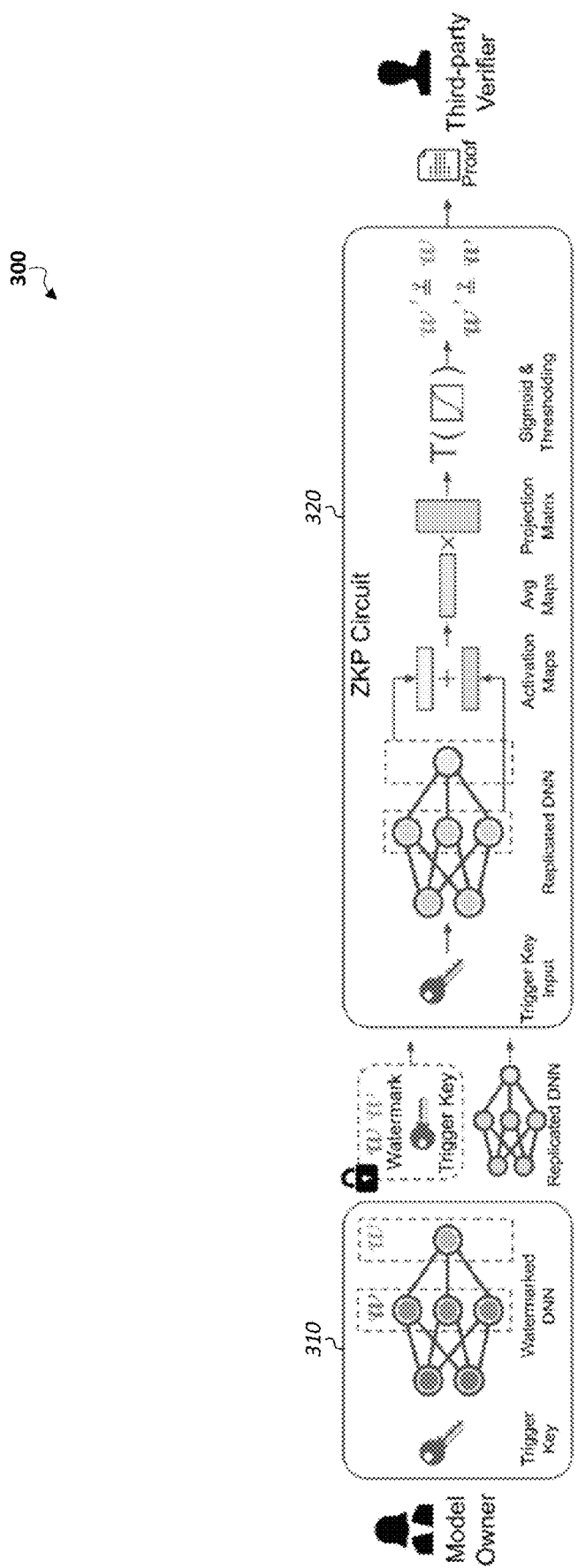
FIG. 3 illustrates a diagram of techniques for performing machine learning model ownership verification, in accordance with some example implementations of the current subject matter.

Turning now to FIG. 3, a diagram illustrating techniques for machine learning model ownership verification is depicted, in accordance with some embodiments. A model owner of a machine learning model may possess a trigger key which is used to extract one or more watermarks from a machine learning model, as shown in block 310 of FIG. 3. One of the priorities of implementing machine learning model ownership verification is to keep the trigger key and the one or more watermarks secret. In other words, the model owner does not want to expose the trigger key and the one or more watermarks to third parties (e.g., a verifier, users).

Accordingly, in an example, a zero knowledge proof (ZKP) circuit 320 may be generated to test a replicated machine learning model (i.e., a different machine learning model suspected of being a copy of the model owner's machine learning model) without exposing the trigger key and watermark(s) of the model owner's machine learning model. The ZKP circuit 320 is constructed so as to deliver the trigger key input to the replicated machine learning model, and various datapoints from the replicated machine learning model are coupled to one or more activation maps, averaging maps, a projection matrix and sigmoid thresholding operations. The output of these processing steps is a decision of whether the watermarks extracted from the replicated machine learning model match the model owner's watermarks. The output of the ZKP circuit 320 may also be referred to as a proof. The proof may be provided to a third-party verifier to indicate whether the replicated machine learning model matches the model owner's machine learning model, without exposing either the trigger key or the watermarks of the model owner. It is noted that when the term "machine learning model" is used herein, this term is intended to represent any type of machine learning model, machine learning engine, or artificial intelligence (AI) model/engine such as a neural network, deep neural network (DNN), convolutional neural network (CNN), recurrent neural network (RNN), inference engine, large language model (LLM), generative pre-trained transformer, generative adversarial network, and the like.

Referring now to FIG. 3, an example of a ZKROWNN watermark extraction algorithm 300 is shown, in accordance with some embodiments. For the ZKROWNN watermark extraction algorithm 300, the public inputs are the model M and a target bit-error rate (BER) θ. The model M refers to the machine learning model being tested to determine if it is a copy or replica of a watermarked machine learning model. The private inputs to the algorithm are the trigger key $X^{key}$, a B-bit watermark wm, a projection matrix $A^{M \times N}$ where M is the size of the feature space and N is the size of wm, and an embedded layer $l_{wm}$ where the watermark will be extracted.

An example circuit is specified within algorithm 300, in accordance with some embodiments. It is noted that the term "circuit" may also be used interchangeably herein with the term "function" as relates to implementing a watermark extraction algorithm. As specified in the circuit of algorithm 300, a check variable is set equal to 1. To implement the circuit, the trigger key $X^{key}$ is provided as an input to model M under test for a feed-forward operation until the embedded layer $l_{wm}$ is reached. The activation maps a are extracted at the layer $l_{wm}$. Then a zero knowledge average function is applied followed by a zero knowledge sigmoid function. The extracted watermark is then generated by performing a zero knowledge hard thresholding on the output of the zero knowledge sigmoid function. In an example, the hard thresholding sets any value less than 0.5 to 0 and sets any value greater than or equal to 0.5 to 1. A bit error rate is then calculated comparing the reference watermark (i.e., the private input watermark wm) with the extracted watermark. The bit error rate may then be returned as the result of the circuit. Alternatively, a comparison of the calculated bit error rate to a desired bit error rate may be returned as the result of the circuit.

In an example, in order to support the circuit presented in Algorithm 300, separate smaller zkSNARK circuits may be provided for each computation, such as sigmoid and thresholding. For the feed-forward operation for example, Dense, Rectified linear unit (ReLU), and Convolution three-dimensional (3D) layers may be used, as it may be assumed that the watermarks are embedded in one of the initial layers of the model. In addition, end-to-end zero-knowledge watermark extraction circuits may be provided for a Multilayer Perceptron (MLP) and Convolutional Neural Network (CNN).

To implement ZKROWNN, xJsnark, which is a high-level framework that enables zkSNARK circuit development, may be used. The generated circuits may be compiled in libsnark, a C++ framework for zkSNARK generation. Proof generation and verification may be implemented with the Groth16 protocol using the BN128 elliptic curve, which provides 128 bits of security. While xJsnark and libsnark have open-source gadgets/arithmetic circuits available for general computation, these circuits are not relevant to the ZKROWNN computations. Therefore, circuits may be designed specifically for watermark extraction. However, these circuits can be generalized and extended for other relevant applications, such as DNN inference.

zkSNARK arithmetic circuits may not natively support floating point computation without requiring conversion to binary circuits. This process incurs large overhead for the prover, which is already the computational bottleneck in zkSNARK schemes. To avoid floating point computation, inputs may be scaled by several orders of magnitude and the result may be truncated. This does not affect performance, as the floating point conversions may be performed in a preprocessing step before the proof generation and all functions may be modified accordingly before circuit generation.

Matrix Multiplication: A zero knowledge matrix multiplication circuit may be implemented that efficiently computes $A^{M \times N} \times B^{N \times L} = C^{M \times L}$, where C is a private matrix and A or B can be public or private, depending on the application. This circuit can be used for dense/fully connected layers that are implemented during the feed-forward step of watermark extraction, or for standard matrix multiplication.

Convolution: The three-dimensional (3D) convolution operation may be implemented by flattening the input and kernel into one-dimensional (1D) vectors. The input is grouped and structured based on the size of the kernel and stride value into a vector. Afterwards, a 1D convolution operation may be performed between the processed input vector and the flattened kernel. An arithmetic circuit for zero-knowledge 1D convolution may be developed which consists of inner product and shift operations.

Sigmoid: The standard sigmoid function is defined as $S(x)=1/(1+e^{(-x)})$, which is a difficult computation to do in zero-knowledge. To work around this, the Chebyshev polynomial approximation of the sigmoid function may be used as shown by equation 500 of FIG. 5. Floating point computation may be converted to integer arithmetic by increasing floating point numbers by several order of magnitudes and truncating.

ReLU and Hard Thresholding: A rectified linear unit (ReLU) may be implemented in a zero-knowledge circuit that computes $f(x)=\max(0, x)$. Due to the similarity between ReLU and hard thresholding, a similar circuit may be used for the two operations. To implement hard thresholding, a threshold β may be taken as an input and a circuit may be built that computes the piecewise function 505 of FIG. 5. Hard thresholding may be performed on the output of the sigmoid function, resulting in a vector of ones and zeroes that can be concatenated to generate the extracted watermark.

Bit Error Rate: The bit error rate is defined as the percentage of bits that differ between the private watermark wm and the ZKROWNN extracted watermark w^m. This is the last computation that is done in the end-to-end implementations. To compute this, a bit by bit comparison of wm and w^m may be performed as a secondary function implemented in the hard thresholding circuit. If the bit error rate is below some predefined threshold θ, the circuit outputs a 1. If not, the circuit will output a 0.

End-to-end Examples: Implementations are presented of ZKROWNN applied to a multilayer perceptron (MLP) and convolutional neural network, assuming that the watermark is embedded in the first hidden layer for both examples.

ZKROWNN still works when the watermark is embedded in deeper layers, at the cost of higher prover complexity.

Experimental Setup. ZKROWNN may be implemented with a libsnark backend using the Groth16 zkSNARK protocol. All zkSNARK circuits may be built using xJsnark. Experiments may be run on a 128 GB RAM, AMD Ryzen 3990X CPU desktop.

ZKROWNN Evaluation Metrics. The following metrics are presented to evaluate ZKROWNN and the individual circuits:

Number of Constraints: The number of constraints is used as an indicator for how large the zkSNARK circuit is. As the number of constraints increases, runtimes also increase.

Setup Runtime: The setup process is used to generated the prover key PK and verifier key VK by a trusted third party. In ZKROWNN's setting, this process is only run once, so its runtime can be amortized.

Prover Runtime: This is defined as the amount of time for prover P to generate a zkSNARK. As zkSNARKs are designed to reduce verifier complexity, this often comes at the cost of increased prover complexity. Much like the setup, this process is only run once in the ZKROWNN setting, so its runtime can be amortized.

Proof Size: Due to the succinctness property of zkSNARKs, the proofs that are generated in ZKROWNN are very small, requiring very little communication between the prover and all verifiers.

Prover Key Size: The prover key size grows with respect to the size witness data in a zkSNARK circuit, so this can grow quite large in various settings. This requires communication from the trusted setup provider to the prover, but, again, this process is only done once.

Verifier Key Size: The verifier key size grows with respect to the size of the public inputs in a zkSNARK circuit. This requires communication between the trusted setup provider and each verifier.

Verifier Runtime: zkSNARKs aim to minimize verifier complexity, so verifier runtime is often in the millisecond range. This greatly benefits ZKROWNN, as one goal is to provide verifiers with a simple scheme to validate their ownership of a model.

Evaluations of ZKROWNN on two DNN benchmarks are presented: a multilayer perceptron (MLP) on the MNIST dataset and a convolutional neural network (CNN) on the CIFAR-10 dataset. These benchmarks are extended from DeepSigns. It is assumed that the model owner embedded a 32-bit watermark in the first hidden layer, however the framework can handle extracting the watermark from any layer. Also, the specific circuits that make ZKROWNN's automated end-to-end framework are benchmarked. ZKROWNN does not result in any lapses in model accuracy, as the implemented scheme does not modify the weights of the model. ZKROWNN is able to achieve the same BER and detection success from extracted watermarks as DeepSigns, while protecting the model owner's trigger keys and preserving the privacy of the watermark.

Table 600 (of FIG. 6) highlights the end-to-end performance of ZKROWNN on the benchmark architectures described in Table 700 (of FIG. 7). The DNN benchmarks use ReLU as the activation function, however the capability of using sigmoid is provided, at the cost of potentially lower model accuracy. Alongside end-to-end performance, the performance of the individual zkSNARK circuits are benchmarked.

When observing the results of ZKROWNN, low communication and runtime for the verifier may be achieved, even with large circuits. The corresponding results are provided in Table 600. Although relatively high prover/setup runtimes may be encountered, proof generation and setup only happen once per circuit. In settings where the zkSNARK circuit does not change, the proof generation and setup runtimes and communications are amortized.

The largest circuit, the MLP circuit, only results in a 127 B proof. This only requires 29.4 ms to verify, and any third party with the verifier key can verify this. The verifier key requires 16 MB of communication from the trusted setup provider to each verifier, due to taking in the model's weights as a public input. Due to memory constraints, a small portion of the first layer matrix multiplication may be precomputed in the MLP, but there is no risk of information leakage, as the precomputed values still act as private inputs. The CNN circuit, requiring only a quarter of the constraints as the MLP circuit, has much more desirable setup, prover, and verifier performance. Prover and setup runtimes and proving key sizes are cut at least in half. The same proof size may be maintained, with a drastically reduced verifier key, due to the reduction of public input size. This results in a 1 ms verification time, which is highly attractive for verifiers.

When looking at the results as a whole, it can be seen that the proof size stays constant, no matter the size of the circuit, which is beneficial in a typical use case. With the largest individual circuit, matrix multiplication with 128×128 inputs, only 0.6 ms are needed to verify computational correctness. As mentioned before, the verifier key grows with the public input, which has a direct effect on the verification runtime. Some circuits, such as sigmoid and averaging, required some extra public inputs to compute correctness, thus leading to some higher verifier key sizes. To reduce runtimes and constraints in an end-to-end example, which are combinations of the individual circuits, specific optimizations such as bit width scaling between operations and combining operations within loops may be employed.

Figure 8:
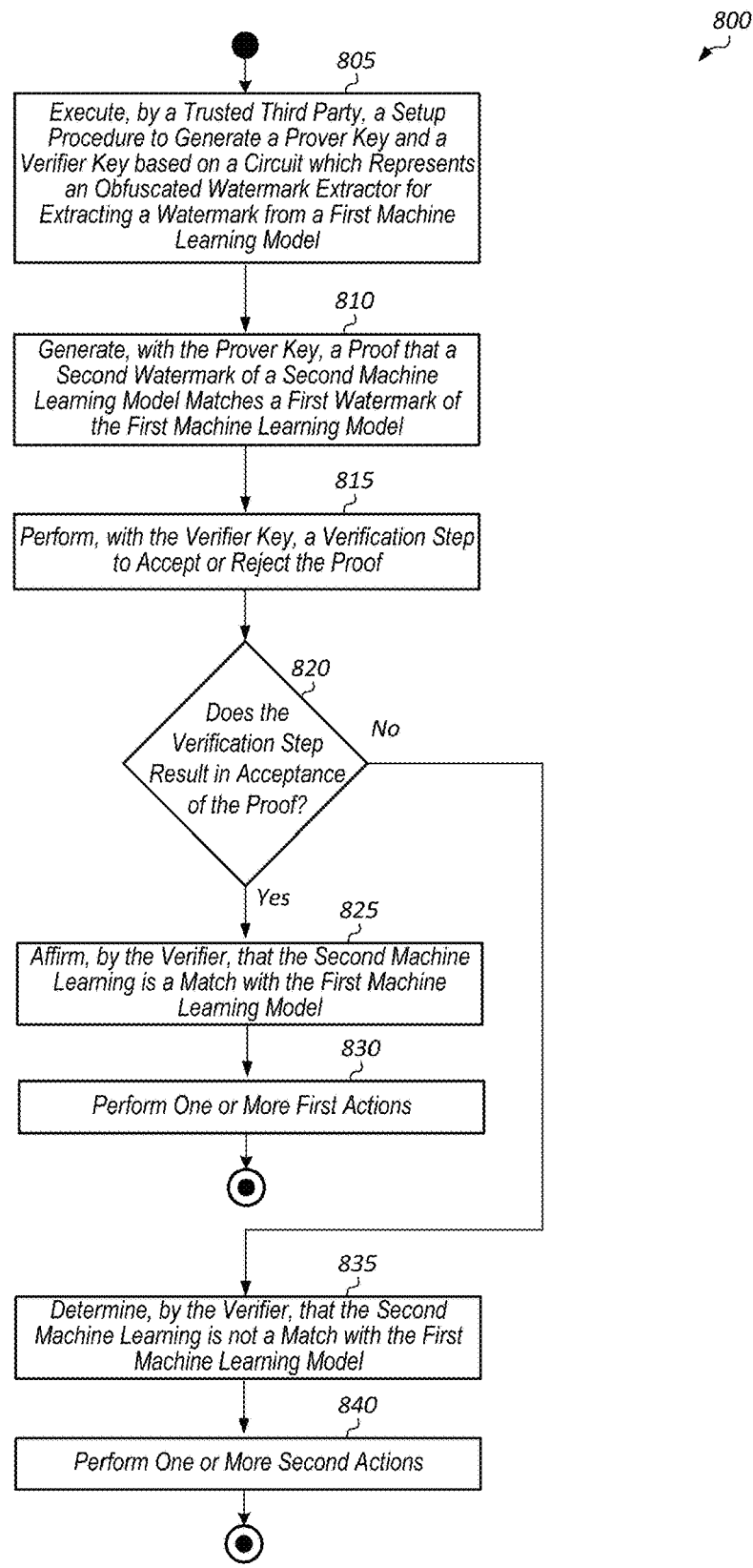
FIG. 8 illustrates an example of a process for performing machine learning model watermark verification, in accordance with some example implementations of the current subject matter.

Referring now to FIG. 8, a process is depicted for performing machine learning model watermark verification, in accordance with one or more embodiments of the current subject matter. A trusted third party (e.g., server 150 of FIG. 1) executes a setup procedure to generate a prover key and verifier key based on a circuit which represents an obfuscated watermark extractor for extracting a watermark from a first machine learning model (block 805). An owner of the first machine learning model generates, with the prover key, a proof that a second watermark of a second machine learning model matches a first watermark of the first machine learning model (block 810). The verifier performs, with the verifier key, a verification step to accept or reject the proof (block 815). If the verification step results in acceptance of the proof (conditional block 820, "yes" leg), then the verifier affirms that the second machine learning model is a match with the first machine learning model (block 825). In other words, the verifier acknowledges that the second machine learning model is a match with the first machine learning model as a result of the verification step. As a result of affirming that the second machine learning model is a match with the first machine learning model, one or more first actions may be performed (block 830). These one or more first actions may include generating an indication in a graphical user interface (GUI) that the second machine learning model is a match with the first machine learning model, preventing one or more users from using the second machine learning model, triggering payment to the owner of the first machine learning model for a user using the second machine learning model, notifying a provider which offers the second machine learning model to customers that the second machine learning model is a match with the first machine learning model, causing a user to be rerouted to an appropriate service for using the first machine learning model, and/or other actions. After block 830, method 800 may end.

If the verification step results in a rejection of the proof (conditional block 820, "no" leg), then the verifier determines that the second machine learning model is not a match with the first machine learning model (block 835). As a result of confirming that the second machine learning model is a match with the first machine learning model, one or more second actions may be performed (block 840). These one or more second actions may include generating an indication in a graphical user interface (GUI) that the second machine learning model is not a match with the first machine learning model, notifying the owner of the first machine learning model that the second machine learning model is not equivalent to the first machine learning model, enabling one or more users to use the second machine learning model without paying the owner of the first machine learning model, and/or other actions. After block 840, method 800 may end.

Figure 9:
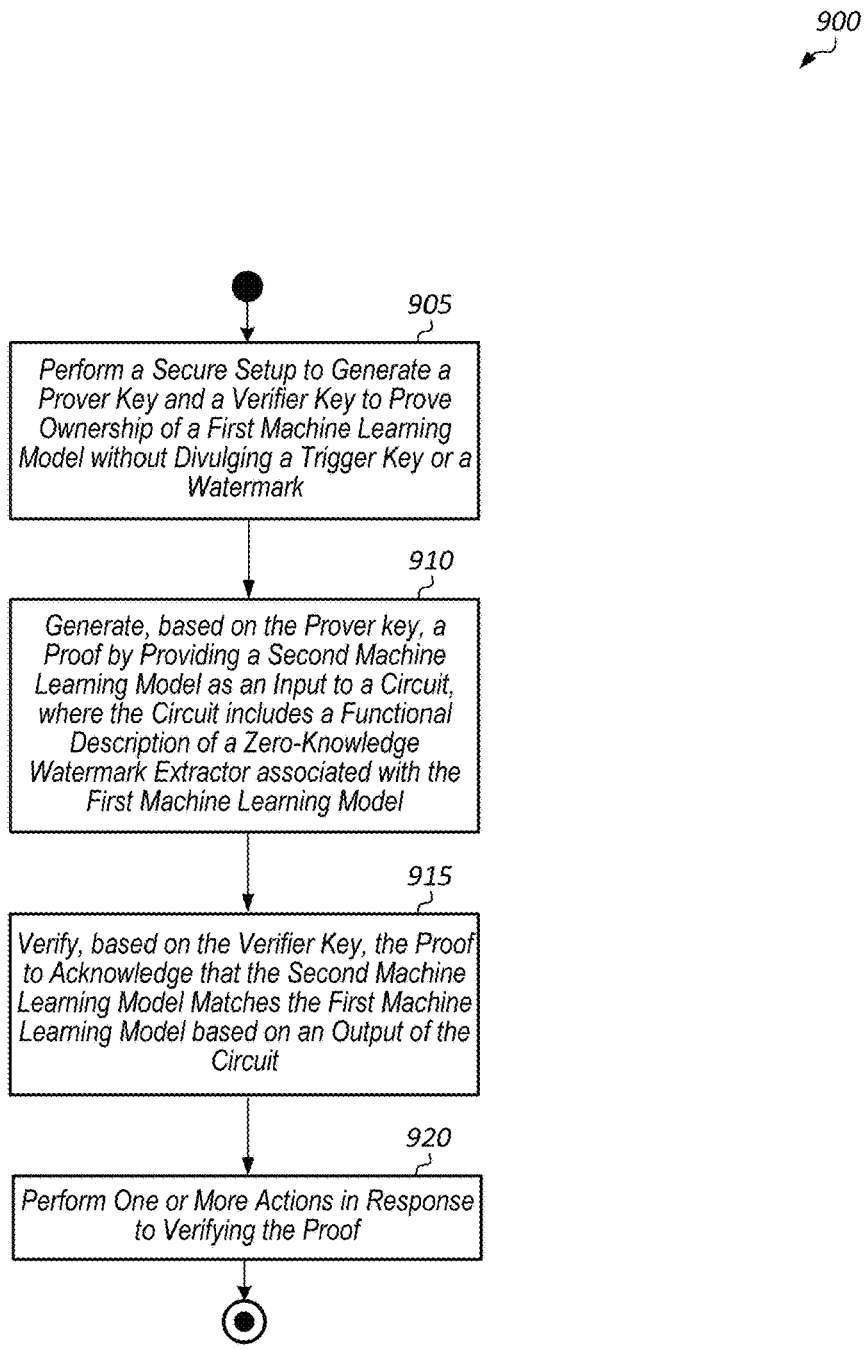
FIG. 9 illustrates an example of a process for verifying a proof of machine learning model ownership, in accordance with some example implementations of the current subject matter.

Turning now to FIG. 9, a process is depicted for verifying a proof of machine learning model ownership, in accordance with one or more embodiments of the current subject matter. A secure setup is performed to generate a prover key and a verifier key to prove ownership of a first machine learning model without divulging a trigger key or a watermark (block 905). In an example, block 905 is performed by a trusted third party (e.g., server 150 of FIG. 1). Next, a proof is generated, based on the prover key, by providing a second machine learning model as an input to a circuit, where the circuit includes a functional description of a zero-knowledge watermark extractor associated with the first machine learning model (block 910). The proof indicates that the prover has an input that successfully satisfies the constraints of the circuit. In other words, the prover has a valid input that satisfies a function represented by the circuit. It is assumed for the purposes of this discussion that the second machine learning model is different from the first machine learning model. In an example, block 910 is performed by an owner of the first machine learning model (e.g., the model owner associated with computing device 110 of FIG. 1).

Then, the proof is verified, based on the verifier key, to acknowledge that the second machine learning model matches the first machine learning model based on an output of the circuit (block 915). In an example, block 915 is performed by a verifier (e.g., the third-party verifier associated with computing device 170 of FIG. 1). Next, one or more actions may be performed in response to verifying the proof (block 920). In an example, the one or more actions may include redirecting a user who is attempting to utilize the second machine learning model from an unauthorized platform (e.g., platform 165 of FIG. 1) to an authorized platform associated with the first machine learning model. In other embodiments, other types of actions may be performed in response to verifying the proof. After block 920, method 900 may end.

Figure 10:
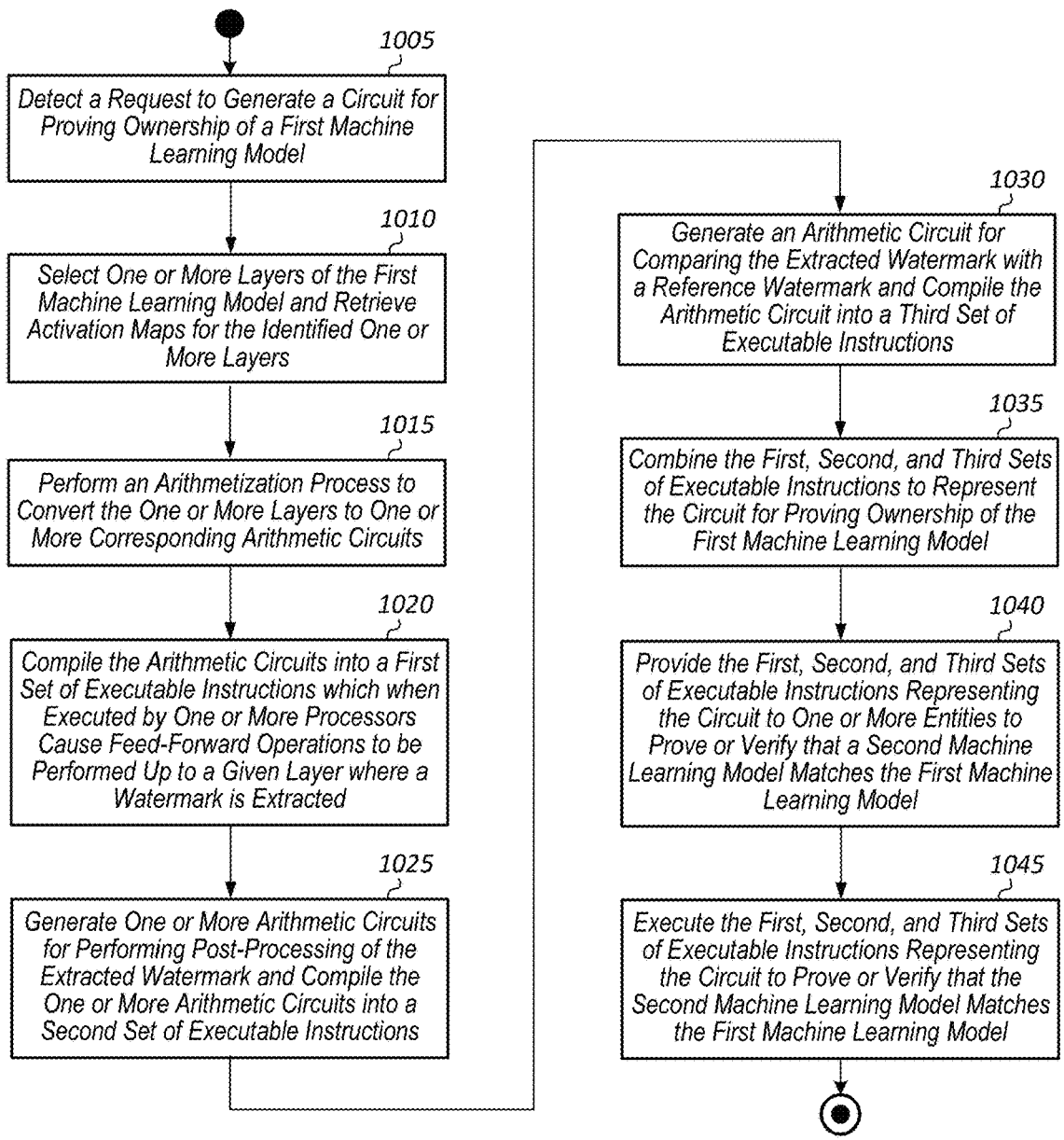
FIG. 10 illustrates an example of a process for generating a circuit for proving ownership of a machine learning model, in accordance with some example implementations of the current subject matter.

Referring now to FIG. 10, a process for generating a circuit for proving ownership of a machine learning model is depicted, in accordance with one or more embodiments of the current subject matter. A request to generate a circuit for proving ownership of a first machine learning model is detected (block 1005). In response to detecting the request, one or more layers of the first machine learning model are selected and activation maps for these one or more layers are retrieved (block 1010). In an example, the one or more layers of the first machine learning model up to the given layer from which a watermark is extracted are selected in block 1010.

Next, an arithmetization process is performed to convert the one or more layers to one or more corresponding arithmetic circuits (block 1015). Then, the arithmetic circuits are compiled into a first set of executable instructions which when executed by one or more processors, perform feed-forward operations up to a given layer where a watermark is extracted (block 1020). Next, one or more arithmetic circuits for performing post-processing of the extracted watermark are generated and compiled into a second set of executable instructions (block 1025). In an example, the post-processing may include performing averaging operations, sigmoid thresholding operations, and/or one or more other operations. Then, an arithmetic circuit for comparing an extracted watermark with a reference watermark is generated and compiled into a third set of executable instructions (block 1030). Next, the first, second, and third sets of executable instructions are combined to represent the circuit for proving ownership of the first machine learning model (block 1035). The first, second, and third sets of executable instructions representing the circuit are then provided to one or more entities to prove or verify that a second machine learning model matches the first machine learning model (block 1040). Next, the first, second, and third sets of executable instructions representing the circuit are executed to prove or verify that a second machine learning model matches the first machine learning model (block 1045). After block 1045, method 1000 ends.

Figure 11:
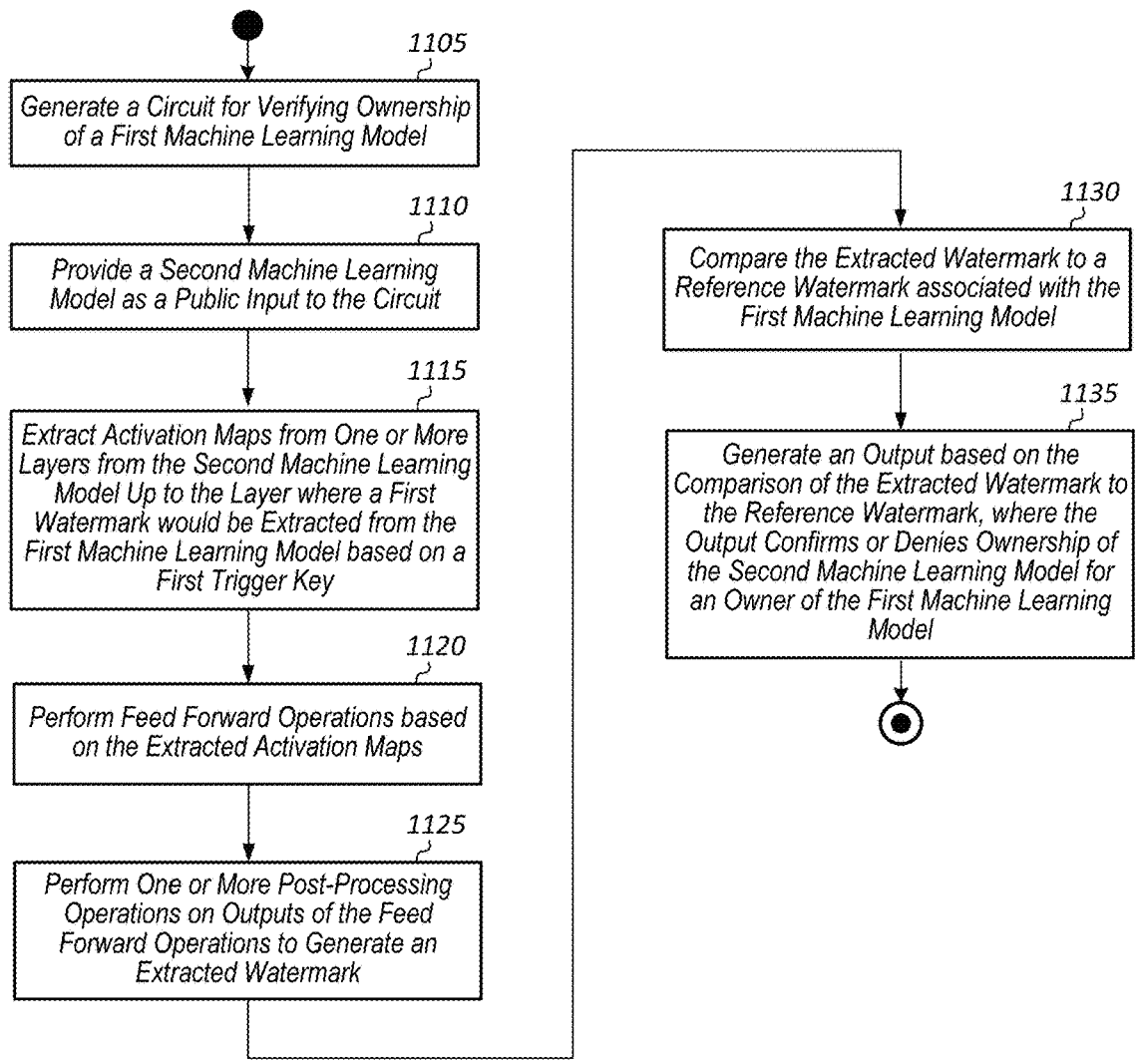
FIG. 11 illustrates an example of a process for verifying ownership of a machine learning model based on a circuit, in accordance with some example implementations of the current subject matter.

Turning now to FIG. 11, a process is depicted for verifying ownership of a machine learning model based on a circuit, in accordance with one or more embodiments of the current subject matter. A circuit is generated for verifying ownership of a first machine learning model (block 1105). An example of generating a circuit, in accordance with some embodiments, for verifying ownership of a first machine learning model is described in method 1000 (of FIG. 10). In other embodiments, other methods for generating a circuit for verifying ownership of a first machine learning model may be employed. It is noted that the circuit may include any combination of hardware (e.g., dedicated circuits, one or more processing units), firmware, and/or software (e.g., executable program instructions). Next, a second machine learning model is provided as a public input to the circuit (block 1110). Then, activation maps from one or more layers are extracted from the second machine learning model up to the layer where a first watermark would be extracted from the first machine learning model based on a first trigger key (block 1115). Next, feed forward operations are performed based on the extracted activation maps (block 1120). Then, one or more post-processing operations are performed on the outputs of the feed forward operations to generate an extracted watermark (block 1125). Next, the extracted watermark is compared to a reference watermark associated with the first machine learning model (block 1130). Then, an output is generated based on the comparison of the extracted watermark to the reference watermark, where the output confirms or denies ownership of the second machine learning model for an owner of the first machine learning model (block 1135). After block 1135, method 1100 may end. It is noted that one or more actions may be taken as a result of the output generated in block 1135 which confirms or denies ownership of the second machine learning model by the owner of the first machine learning model. In some cases, multiple watermarks may be extracted and compared with multiple reference watermarks in embodiments where the first machine learning model has more than one embedded watermark. In these cases, blocks 1115-1135 may be repeated for each separate watermark of the first machine learning model.

Figure 12:
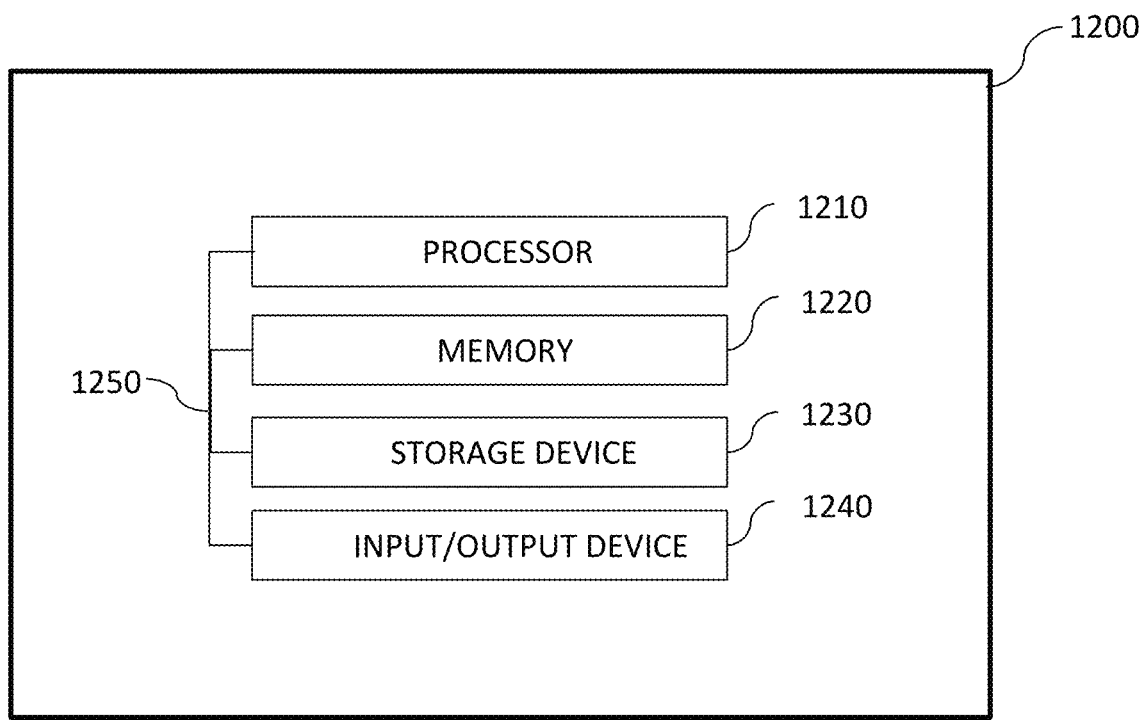
FIG. 12 illustrates an example of a system, in accordance with some example implementations of the current subject matter.

In some implementations, the current subject matter may be configured to be implemented in a system 1200, as shown in FIG. 12. For example, the operations of ZKROWNN (or one or more if not all of the aspects of ZKROWNN) may be at least in part physically comprised on system 1200. To illustrate further system 1200 may further an operating system, a hypervisor, and/or other resources, to provide virtualize physical resources (e.g., via virtual machines). The system 1200 may include a processor 1210, a memory 1220, a storage device 1230, and an input/output device 1240. Each of the components 1210, 1220, 1230 and 1240 may be interconnected using a system bus 1250. The processor 1210 may be configured to process instructions for execution within the system 1200. In some implementations, the processor 1210 may be a single-threaded processor. In alternate implementations, the processor 1210 may be a multi-threaded processor. The processor 1210 may be further configured to process instructions stored in the memory 1220 or on the storage device 1230, including receiving or sending information through the input/output device 1240. The memory 1220 may store information within the system 1200. In some implementations, the memory 1220 may be a computer-readable medium. In alternate implementations, the memory 1220 may be a volatile memory unit. In yet some implementations, the memory 1220 may be a non-volatile memory unit. The storage device 1230 may be capable of providing mass storage for the system 1200. In some implementations, the storage device 1230 may be a computer-readable medium. In alternate implementations, the storage device 1230 may be a floppy disk device, a hard disk device, an optical disk device, a tape device, non-volatile solid state memory, or any other type of storage device. The input/output device 1240 may be configured to provide input/output operations for the system 1200. In some implementations, the input/output device 1240 may include a keyboard and/or pointing device. In alternate implementations, the input/output device 1240 may include a display unit for displaying graphical user interfaces.

Figure 13:
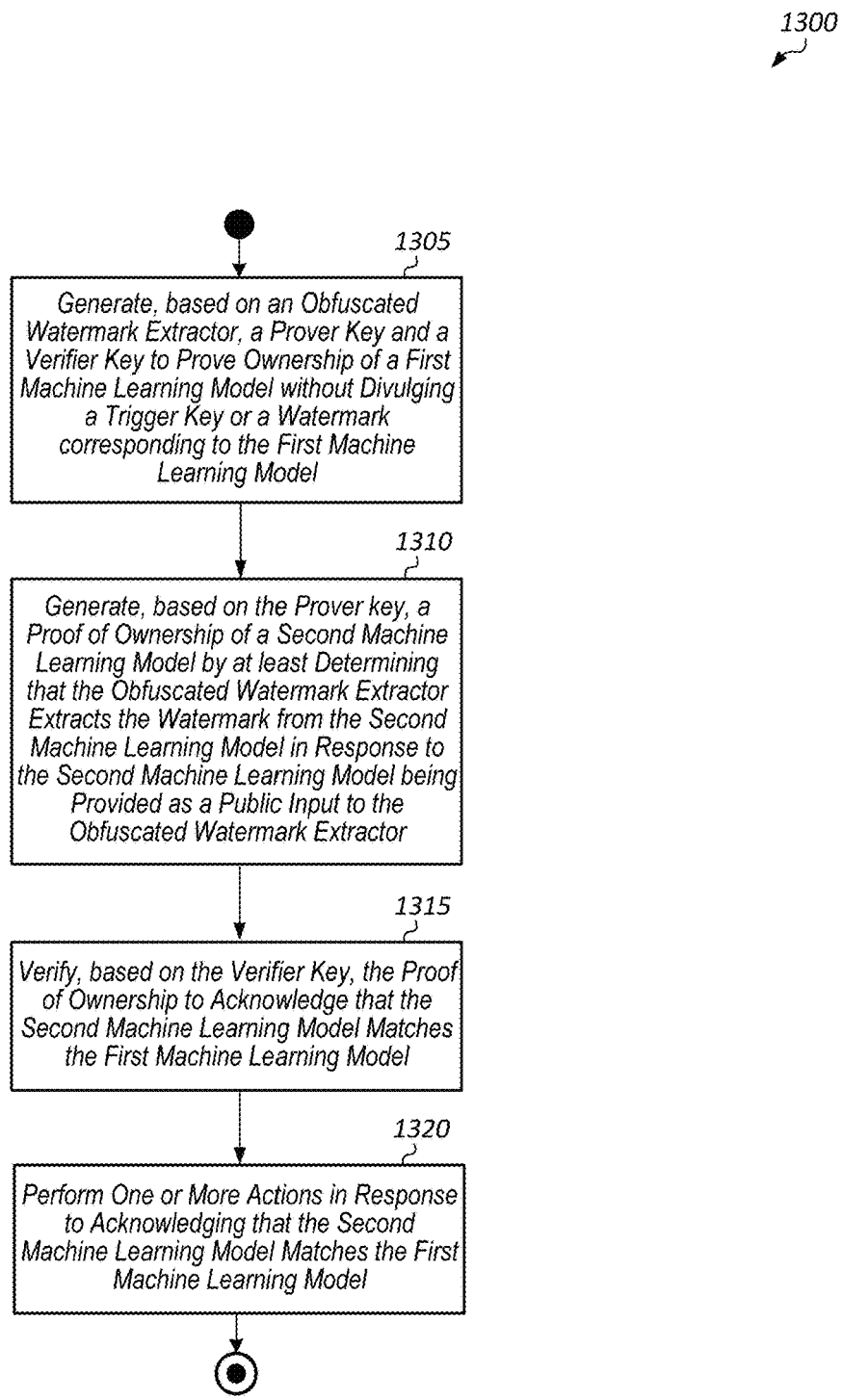
FIG. 13 illustrates an example of a process for verifying ownership of a machine learning model, in accordance with some example implementations of the current subject matter.

Referring now to FIG. 13, a process is depicted for verifying ownership of a machine learning model, in accordance with one or more embodiments of the current subject matter. A system (e.g., system 100 of FIG. 1) generates, based on an obfuscated watermark extractor, a prover key and a verifier key to prove ownership of a first machine learning model without divulging a trigger key or a watermark corresponding to the first machine learning model (block 1305). Next, the system generates, based on the prover key, a proof of ownership of a second machine learning model by at least determining that the obfuscated watermark extractor extracts the watermark from the second machine learning model in response to the second machine learning model being provided as a public input to the obfuscated watermark extractor (block 1310). Then, the system verifies, based on the verifier key, the proof of ownership to acknowledge that the second machine learning model matches the first machine learning model (block 1315). Next, the system performs one or more actions in response to acknowledging that the second machine learning model matches the first machine learning model (block 1320). In an example, the one or more actions performed in block 1320 may include redirecting an attempt to access the second machine learning model to the first machine learning model in response to acknowledging that the second machine learning model matches the first machine learning model. Other types of actions may also be performed in response to acknowledging that the second machine learning model matches the first machine learning model. After block 1320, method 1300 may end.

It is noted that any of the components of system 100 may perform one or more of the steps of method 1300. In some cases, a first component may perform a first step, a second component may perform a second step, and so on. In other cases, one component may perform multiple steps of method 1300.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, articles, and/or articles of manufacture depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system comprising: at least one processor; at least one memory storing instructions that, when executed by the at least one processor, cause operations comprising: generating, based on an obfuscated watermark extractor, a prover key and a verifier key to prove ownership of a first machine learning model without divulging a trigger key or a watermark corresponding to the first machine learning model; generating, based on the prover key, a proof of ownership of a second machine learning model by at least determining that the obfuscated watermark extractor extracts the watermark from the second machine learning model in response to the second machine learning model being provided as a public input to the obfuscated watermark extractor; verifying, based on the verifier key, the proof of ownership to acknowledge that the second machine learning model matches the first machine learning model; and redirecting an attempt to access the second machine learning model to the first machine learning model in response to acknowledging that the second machine learning model matches the first machine learning model.

Example 2: The system of Example 1, wherein the attempt to access the second machine learning model is redirected from a first platform to a second platform, wherein the first platform is associated with the second machine learning model, and wherein the second platform is associated with the first machine learning model.

Example 3: The system of any of Examples 1-2, wherein the operations further comprise generating the proof of ownership by providing a first private input to the obfuscated watermark extractor, and wherein the first private input is the trigger key which causes the first machine learning model to output the watermark.

Example 4: The system of any of Examples 1-3, wherein the obfuscated watermark extractor is configured to extract the watermark from a copy of the first machine learning model without divulging a trigger key or the watermark.

Example 5: The system of any of Examples 1-4, wherein the obfuscated watermark extractor is configured to extract the watermark from a given layer of the copy of the first machine learning model without divulging an identity of the given layer.

Example 6: The system of any of Examples 1-5, wherein the operations further comprise performing, by the obfuscated watermark extractor, feed forward computations and sigmoid thresholding for trigger detection.

Example 7: The system of any of Examples 1-6, wherein the operations further comprise generating, based on the prover key, a second proof of ownership by providing a third machine learning model as a public input to the obfuscated watermark extractor.

Example 8: The system of any of Examples 1-7, wherein the operations further comprise verifying, based on the verifier key and an output of the obfuscated watermark extractor, the second proof of ownership to acknowledge that the third machine learning model matches the first machine learning model.

Example 9: The system of any of Examples 1-8, wherein the operations further comprise performing one or more actions in response to acknowledging that the second machine learning model matches the first machine learning model.

Example 10: The system of any of Examples 1-9, wherein the one or more actions are performed to prevent usage of the second machine learning model.

Example 11: The system of any of Examples 1-10, wherein the operations further comprises providing a target bit error rate as a public input to the obfuscated watermark extractor.

Example 12: The system of any of Examples 1-11, wherein if a detected bit error rate is below the target bit error rate, the operations comprise generating, by the obfuscated watermark extractor, an indication that the second machine learning model matches the first machine learning model.

Example 13: The system of any of Examples 1-12, wherein the operations further comprise performing, by the obfuscated watermark extractor, feed-forward operations until a given layer embedded with the watermark is reached.

Example 14: A computer-implemented method comprising: generating, based on an obfuscated watermark extractor, a prover key and a verifier key to prove ownership of a first machine learning model without divulging a trigger key or a watermark corresponding to the first machine learning model; generating, based on the prover key, a proof of ownership of a second machine learning model by at least determining that the obfuscated watermark extractor extracts the watermark from the second machine learning model in response to the second machine learning model being provided as a public input to the obfuscated watermark extractor; verifying, based on the verifier key, the proof of ownership to acknowledge that the second machine learning model matches the first machine learning model; and redirecting an attempt to access the second machine learning model to the first machine learning model in response to acknowledging that the second machine learning model matches the first machine learning model.

Example 15: The computer-implemented method of Example 14, wherein the attempt to access the second machine learning model is redirected from a first platform to a second platform, wherein the first platform is associated with the second machine learning model, and wherein the second platform is associated with the first machine learning model.

Example 16: The computer-implemented method of any of Examples 14-15, further comprising generating the proof of ownership by providing a first private input to the obfuscated watermark extractor, wherein the first private input is the trigger key which causes the first machine learning model to output the watermark.

Example 17: The computer-implemented method of any of Examples 14-16, further comprising performing, by the obfuscated watermark extractor, feed forward computations and sigmoid thresholding for trigger detection.

Example 18: The computer-implemented method of any of Examples 14-17, further comprising performing one or more actions in response to acknowledging that the second machine learning model matches the first machine learning mode.

Example 19: The computer-implemented method of any of Example 14-18, wherein the one or more actions are performed to prevent usage of the second machine learning model.

Example 20: A non-transitory computer readable medium storing instructions, which when executed by at least one data processor, result in operations comprising: generating, based on an obfuscated watermark extractor, a prover key and a verifier key to prove ownership of a first machine learning model without divulging a trigger key or a watermark corresponding to the first machine learning model; generating, based on the prover key, a proof of ownership of a second machine learning model by at least determining that the obfuscated watermark extractor extracts the watermark from the second machine learning model in response to the second machine learning model being provided as a public input to the obfuscated watermark extractor; verifying, based on the verifier key, the proof of ownership to acknowledge that the second machine learning model matches the first machine learning model; and redirecting an attempt to access the second machine learning model to the first machine learning model in response to acknowledging that the second machine learning model matches the first machine learning model.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A system comprising:
   at least one processor;
   at least one memory storing instructions that, when executed by the at least one processor, cause operations comprising:
     generating, based on an obfuscated watermark extractor, a prover key and a verifier key to prove ownership of a first machine learning model without divulging a trigger key or a watermark corresponding to the first machine learning model;
     generating, based on the prover key, a proof of ownership of a second machine learning model by at least determining that the obfuscated watermark extractor extracts the watermark from the second machine learning model in response to the second machine learning model being provided as a public input to the obfuscated watermark extractor;

verifying, based on the verifier key, the proof of ownership to acknowledge that the second machine learning model matches the first machine learning model; and redirecting an attempt to access the second machine learning model to the first machine learning model in response to acknowledging that the second machine learning model matches the first machine learning model.

2. The system of claim 1, wherein the attempt to access the second machine learning model is redirected from a first platform to a second platform, wherein the first platform is associated with the second machine learning model, and wherein the second platform is associated with the first machine learning model.

3. The system of claim 1, wherein the operations further comprise generating the proof of ownership by providing a first private input to the obfuscated watermark extractor, and wherein the first private input is the trigger key which causes the first machine learning model to output the watermark.

4. The system of claim 1, wherein the obfuscated watermark extractor is configured to extract the watermark from a copy of the first machine learning model without divulging a trigger key or the watermark.

5. The system of claim 4 wherein the obfuscated watermark extractor is configured to extract the watermark from a given layer of the copy of the first machine learning model without divulging an identity of the given layer.

6. The system of claim 1, wherein the operations further comprise performing, by the obfuscated watermark extractor, feed forward computations and sigmoid thresholding for trigger detection.

7. The system of claim 1, wherein the operations further comprise generating, based on the prover key, a second proof of ownership by providing a third machine learning model as a public input to the obfuscated watermark extractor.

8. The system of claim 7, wherein the operations further comprise verifying, based on the verifier key and an output of the obfuscated watermark extractor, the second proof of ownership to acknowledge that the third machine learning model matches the first machine learning model.

9. The system of claim 1, wherein the operations further comprise performing one or more actions in response to acknowledging that the second machine learning model matches the first machine learning model.

10. The system of claim 9, wherein the one or more actions are performed to prevent usage of the second machine learning model.

11. The system of claim 1, wherein the operations further comprises providing a target bit error rate as a public input to the obfuscated watermark extractor.

12. The system of claim 11, wherein if a detected bit error rate is below the target bit error rate, the operations comprise generating, by the obfuscated watermark extractor, an indication that the second machine learning model matches the first machine learning model.

13. The system of claim 1, wherein the operations further comprise performing, by the obfuscated watermark extractor, feed-forward operations until a given layer embedded with the watermark is reached.

14. A computer-implemented method comprising:
generating, based on an obfuscated watermark extractor, a prover key and a verifier key to prove ownership of a first machine learning model without divulging a trigger key or a watermark corresponding to the first machine learning model;

generating, based on the prover key, a proof of ownership of a second machine learning model by at least determining that the obfuscated watermark extractor extracts the watermark from the second machine learning model in response to the second machine learning model being provided as a public input to the obfuscated watermark extractor;

verifying, based on the verifier key, the proof of ownership to acknowledge that the second machine learning model matches the first machine learning model; and redirecting an attempt to access the second machine learning model to the first machine learning model in response to acknowledging that the second machine learning model matches the first machine learning model.

15. The computer-implemented method of claim 14, wherein the attempt to access the second machine learning model is redirected from a first platform to a second platform, wherein the first platform is associated with the second machine learning model, and wherein the second platform is associated with the first machine learning model.

16. The computer-implemented method of claim 14, further comprising generating the proof of ownership by providing a first private input to the obfuscated watermark extractor, wherein the first private input is the trigger key which causes the first machine learning model to output the watermark.

17. The computer-implemented method of claim 14, further comprising performing, by the obfuscated watermark extractor, feed forward computations and sigmoid thresholding for trigger detection.

18. The computer-implemented method of claim 14, further comprising performing one or more actions in response to acknowledging that the second machine learning model matches the first machine learning model.

19. The computer-implemented method of claim 18, wherein the one or more actions are performed to prevent usage of the second machine learning model.

20. A non-transitory computer readable medium storing instructions, which when executed by at least one data processor, result in operations comprising:
generating, based on an obfuscated watermark extractor, a prover key and a verifier key to prove ownership of a first machine learning model without divulging a trigger key or a watermark corresponding to the first machine learning model;

generating, based on the prover key, a proof of ownership of a second machine learning model by at least determining that the obfuscated watermark extractor extracts the watermark from the second machine learning model in response to the second machine learning model being provided as a public input to the obfuscated watermark extractor;

verifying, based on the verifier key, the proof of ownership to acknowledge that the second machine learning model matches the first machine learning model; and redirecting an attempt to access the second machine learning model to the first machine learning model in response to acknowledging that the second machine learning model matches the first machine learning model.

* * * * *